United States Patent [19]

Jones

[11] Patent Number: 4,699,462
[45] Date of Patent: Oct. 13, 1987

[54] FIBER OPTIC CABLE TERMINATION AND METHOD FOR FORMING SAME

[75] Inventor: Theodore L. Jones, Lancaster, Pa.

[73] Assignee: RCA Corporation, Del.

[21] Appl. No.: 785,792

[22] Filed: Oct. 9, 1985

[51] Int. Cl.⁴ .............................................. G02B 6/44
[52] U.S. Cl. .................................................. 350/96.23
[58] Field of Search .................... 350/96.20, 96.23, 320

[56] References Cited

U.S. PATENT DOCUMENTS

| 4,237,474 | 12/1980 | Ladany | 357/81 |
| 4,290,668 | 9/1981 | Ellis et al. | 350/96.20 |
| 4,319,802 | 3/1985 | Bowes | 350/96.20 |
| 4,432,129 | 2/1984 | Featsent | 29/447 |
| 4,479,698 | 10/1984 | Landis et al. | 350/96.20 |
| 4,488,040 | 12/1984 | Rowe | 250/227 |

FOREIGN PATENT DOCUMENTS

| 0009948 | 1/1979 | Japan | 350/96.23 |
| 0073702 | 5/1982 | Japan | 350/96.23 |
| 0191605 | 11/1982 | Japan | 350/96.23 |
| 0137806 | 8/1983 | Japan | 350/96.23 |

OTHER PUBLICATIONS

RCA Corporation publication.

AMP Corporation advertisement.

Primary Examiner—William L. Sikes
Assistant Examiner—Akm E. Ullah
Attorney, Agent, or Firm—Fred Jacob

[57] ABSTRACT

A method is disclosed for forming a termination between a fiber optic cable having a centrally positioned optical fiber and a plurality of surrounding reinforcement strands and an outer jacket and a component housing having a tubular extension. In the disclosed method of forming the termination, a portion of the outer jacket is removed to expose a predetermined length of the optical fiber and reinforcement strands. The exposed length of the optical fiber is then inserted through the tubular extension into the component housing and fixed in alignment with an electro-optic component. Thereafter, an adhesive layer is applied over the outer diameter surface of the tubular extension and the reinforcement strands are positioned about the tubular member on the adhesive layer. To complete the termination, a length of a heat-shrink tubing is positioned over the tubular extension and a portion of the jacket remaining on the fiber optic cable and thereafter shrunk so as to force the reinforcement fibers into adhesive engagement with the adhesive layer on the outer diameter surface of the tubular extension.

5 Claims, 5 Drawing Figures

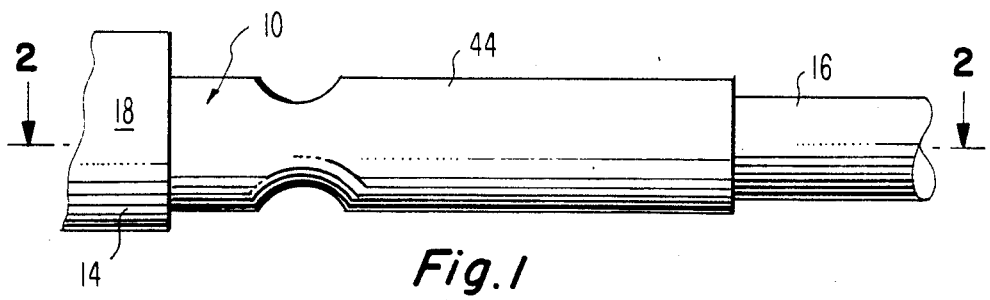
Fig. 1
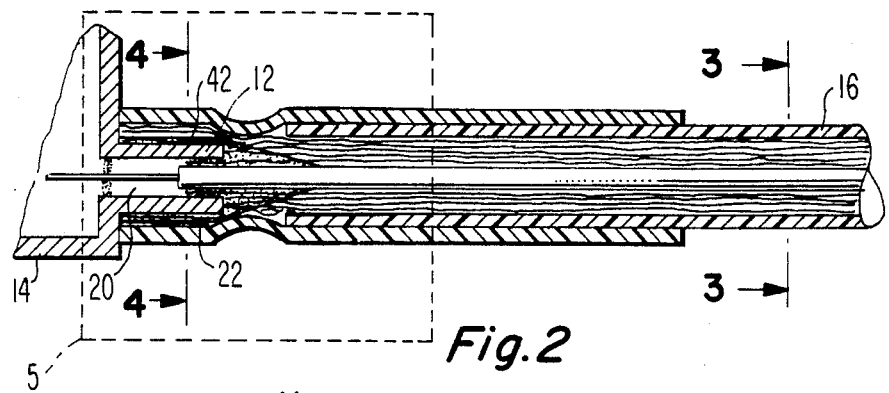
Fig. 2
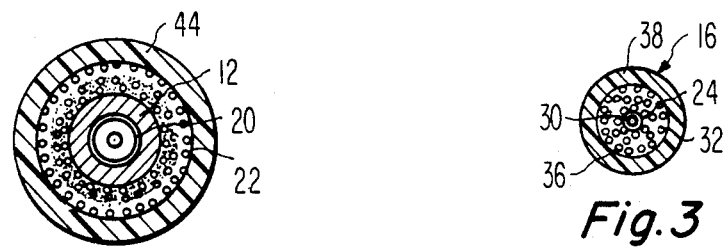
Fig. 4
Fig. 3
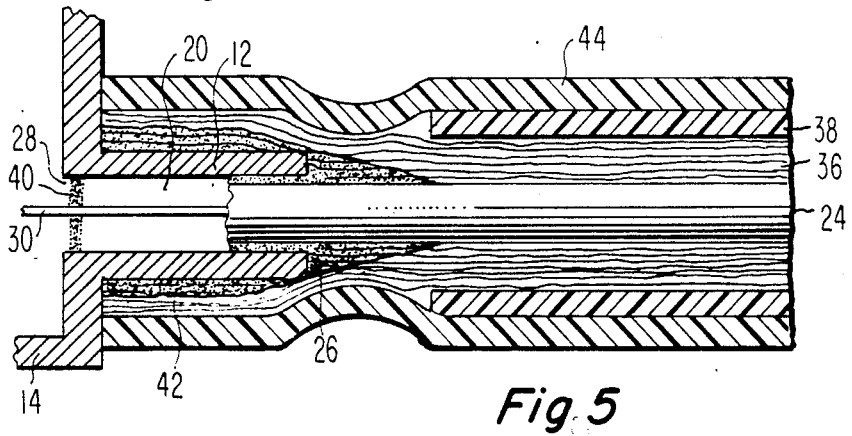
Fig. 5

FIBER OPTIC CABLE TERMINATION AND METHOD FOR FORMING SAME

This invention relates to a novel fiber optic cable termination and to the method for forming the termination. More particularly, this invention is concerned with a fiber optic cable termination having unexpectedly improved strain relief properties.

BACKGROUND OF THE INVENTION

Fiber optic systems comprised of optical fibers and electro-optic components are widely used in a variety of applications, such as telecommunication of information and the like. Optical fibers have a small diameter core of a transparent material and a cladding of a polymeric material formed about the outer surface of the core. However, optical fibers are relatively weak and are especially subject to breakage when strain is applied to the fibers. Also, if strain is applied to the optical fibers of a fiber optic system, the fibers can be forced out of alignment with a electro-optic component causing the system to become inoperative. Thus, the optical fibers are conventionally encased in a fiber optic cable to protect them from damage and to prevent misalignment. The most widely used type of fiber optic cables have an optical fiber positioned in the center of the cable, a plurality of reinforcement strands positioned circumferentially about the optical fiber and aligned with the length of the optical fiber to relieve strain on the optical fiber, and an outer jacket disposed over and about the reinforcement strands.

The electro-optic components employed with fiber optic systems include a wide variety of different types of devices, such as light emmitters, light detectors and signal repeaters. Many of the electro-optic components are highly sensitive to environmental contaminants and are highly susceptible to physical damage. To prevent damage to the components they are packaged in sealed protective housings. The component housings are made in various configurations to accommodate the different types of devices and include an opening for passage of an optical fiber into the interior of the housing for alignment with the encased component.

When assembling a typical fiber optic system, a terminal end of an optical fiber is precisely aligned with an electro-optic component in a component housing and secured in position. The component housing is then preferably hermetically sealed and the remaining portion of the fiber optic cable, that is, the reinforcement fibers and the jacket, are trimmed and secured to the component housing, typically with an optical fiber coupling or a length of shrink-fit tubing.

The termination of the fiber optic cable with the component housing presents serious problems from both a production standpoint and a performance standpoint. Certain of the methods heretofore suggested require a relatively complex series of steps and a skilled operator in order to make a satisfactory termination of the fiber optic cable. Certain other suggested methods employ fittings similar to those used in optical fiber couplings which result in the termination being excessively large. The most serious problem encountered with the suggested methods is that the terminations produced by the suggested methods do not provide adequate strain relief to prevent movement and misalignment of the optical fiber within the component housing when the fiber optic cable is subjected to strain.

What would be highly desirable would be a method for forming a termination of a fiber optic cable with a component housing, which termination is simple to form, compact and provides strain relief for the optical fiber.

SUMMARY OF THE INVENTION

A method is disclosed for forming a termination between (a) a fiber optic cable having a centrally positioned optical fiber and a plurality of surrounding reinforcement strands and an outer jacket; and (b) a component housing having a tubular extension. In the disclosed method, a section of the outer jacket is removed to expose a predetermined length of the optical fiber and the reinforcement strands. The exposed length of the optical fiber is then inserted through the tubular extension into the component housing and fixed in alignment with the electro-optic component in the housing. Thereafter, an adhesive layer is applied over the outer diameter surface of the tubular extension. The reinforcement strands are then positioned about the adhesive layer on the tubular extension. A length of a heat-shrink tubing is then positioned about the reinforcement strands on the tubular extension and about a portion of the jacket remaining on the fiber optic cable. Thereafter, the tubing is heated so as to cause it to shrink and force the reinforcement fibers into the adhesive layer on the outer diameter surface of the tubular extension.

BRIEF DESCRIPTION OF THE DRAWING

FIG. 1 is an illustration of a fiber optic cable termination of this invention.

FIG. 2 is a cross-sectional illustration of the fiber optic cable termination of FIG. 1 taken as indicated by the lines and arrows 2—2 on FIG. 1.

FIG. 3 is a cross-sectional illustration of a fiber optic cable taken as indicated by the lines and arrows 3—3 on FIG. 2.

FIG. 4 is a cross-sectional illustration of the fiber optic cable termination of this invention taken as indicated by the lines and arrows 4—4 on FIG. 2.

FIG. 5 is an enlargment of the section of FIG. 2 indicated with the dotted outline and the number 5.

DETAILED DESCRIPTION OF THE INVENTION

The fiber optic cable termination 10 of this invention is formed between a tubular extension 12 of a component housing 14 (shown in partial section) and an end portion of a fiber optic cable 16. The component housing 14 used in this invention can be of various shapes to accommodate the different types of electro-optical devices (not shown) and must include a tubular extension 12 which extends outwardly from the main body 18 of the component housing 14. The tubular extension 12 should be formed as an integral part of the component housing 14 to facilitate hermetic sealing. The tubular extension 12 extends away from the main body 18 of the component housing 14 for a predetermined distance which is sufficient to form a bond between the fiber optic cable 16 and the tubular extension 12, as will be explained in greater detail below. The tubular extension 12 is formed with an internal passage 20 having an inner diameter which is only slightly larger than the outer diameter of the optical fiber 24 of the fiber optic cable 16 to be joined to the component housing 14. The internal passage 20 extends from a first terminal end 26 at the distal end of the tubular extension 12 to a second terminal end 28 which is in communication with the interior of the component housing 14.

The fiber optic cable 16 which is employed in the method of this invention is of conventional construction, the type generally described above. As shown in FIG. 2 and more clearly in FIG. 3, the fiber optic cable 16 has an optical fiber 24 in the center thereof which has a core 30 made of glass, a transparent plastic or another transparent material and a cladding 32 about the outer surface of the core 30. Surrounding the optical fiber 24 are a plurality of reinforcement strands 36 which are made of a relatively flexible strong synthetic material, such as Kevlar (aramid fiber) sold by E.I. DuPont DeNemour and Company. A compliant jacket 38 made of Teflon (tetrafluoroethylene resin) or nylon is disposed about the reinforcement strands 36 of the fiber optic cable 16.

The initial step in the formation of the fiber optic cable termination 10 of this invention is to remove a predetermined length of the jacket 38 from an end of the fiber optic cable 16. The removal of the jacket 38 will cause the reinforcement strands 36 and the optical fiber 24 to be exposed. The length of the section of the jacket 38 which is removed should be at least about as long as the tubular extension 12 of the component housing 14 and preferably should be somewhat longer so as to expose a sufficient length of the optical fiber 24 to facilitate proper alignment of the optical fiber 24 with the fiber optical component (not shown) packaged in the component housing 14.

The optical fiber 24 is inserted into the first terminal end 26 and through the internal passage 20 of the tubular extension 12 and preferably substantially into the body of the component housing 14. The terminal end of the core 30 of the optical fiber 24 is then placed in alignment with the electro-optic component by known methods, such as those disclosed in U.S. Pat. No. 4,237,474 of Ladany and U.S. Pat. No. 4,479,698 of Landis et al. Thereafter, a hermetic seal 40 is preferably formed about the core 30 of the optical fiber 24.

An adhesive layer 42, preferably made of a heat-activatable adhesive, is then applied over the outer diameter 22 of the tubular extension 12. The adhesive layer 42 can be applied in liquid form, tape form or the like. It has, however, been found preferable to apply a length of commercially available heat-activatable adhesive tubing over the outer diameter 22 of the tubular extension 12. It is also desirable to provide additional adhesive beyond the end of the tubular extension 12 in order to form a bond of the cladding 32 optical fiber 24 directly to the interior passage 20 of the tubular extension 12.

After the adhesive layer 42 is in position, the exposed reinforcement strands 36 are positioned over the adhesive layer 42 so that the strands 36 are arranged about the tubular extension 12. A length of shrink-fit tubing 44 is then placed over the reinforcement strands 36 positioned over the adhesive layer 42, and also over a portion of the jacket 38 remaining on the fiber optic cable 16. The resulting assembly is then heated with, for example, a hot air gun, to a temperature which causes the adhesive layer 42 to soften and become highly adhesive and also causes the tubing 44 to shrink in diameter and forces a major portion of the reinforcement strands 36 into the adhesive layer 42. The tubing 44 also forms a shrink-fit joint with the jacket 38 of the fiber optic cable 16.

As can best be seen in FIG. 5, the elements comprising the resulting fiber optic cable termination 10 are secured together in what is effectively a single unit. The adhesive layer 42 secures the optical fiber 24 to the inside of the tubular extension 12 so as to limit the fiber's movement. The portion of adhesive layer 42 on the outer surface of the tubular extension 12 adhesively secures a major portion of the reinforcement strands 36 to the tubular extension 12 so as to provide strain relief to the fiber optic cable 16 and the shrink-fit tubing 44 holds the reinforcement strands 36 in engagement with the tubular extension 12 and also provides a load-carrying connection of the shrink-fit tubing 44 to the jacket 38 of the fiber optic cable 16.

The resulting termination 10 which is formed between the fiber optic cable 16 and the component housing 14 has been found to provide excellent protection to the optical fiber 24, particularly in relieving a strain on the optical fiber 24.

What is claimed is:

1. A fiber optic cable termination comprising:
   (a) a fiber optic cable including an elongated optical fiber, a plurality of reinforcement strands in a spaced-apart relationship circumferentially about and aligned with the length of the optical fiber, and a jacket positioned about the reinforcement strands, the fiber optic cable having a terminal end portion of predetermined length from which the jacket is removed and the reinforcement strands of the terminal end portion being spaced radially from the optical fiber;
   (b) a component housing having a tubular extension of a length no greater than the predetermined length of said optical fiber, said tubular extension having an outer diameter surface over which extends the reinforcing strands that are radially spaced from the optical fiber, and said tubular extension having an internal passage in which the optical fiber passes through to the component housing;
   (c) an adhesive layer positioned over the outer diameter surface of the tubular extension to adhesively engage the outer diameter surface and the reinforcement strands; and
   (d) a length of shrink-fit tubing passing over the reinforcing strands and the jacket of the fiber optic cable and said length of shrink-fit tubing being in shrink-fit connection with the reinforcement strands and the jacket of the fiber optic cable.

2. The method of forming a termination between
   a terminal end portion of a fiber optic cable having a centrally positioned elongated optical fiber, a plurality of elongated reinforcement strands positioned in a space-apart relationship circumferentially around and aligned lengthwise with the optical fiber and a jacket disposed about the reinforcement strands; and
   a component housing having a tubular extension of a predetermined length, an outer diameter surface, first and second terminal ends, and a passage of a predetermined inner diameter extending from the first terminal end to the second terminal end, said method comprising the steps of:
   (a) removing a lengthwise section of said jacket from the terminal end portion of the fiber optic cable which section is at least as long as the predetermined length, thereby providing an exposed length of optical fiber and exposed lengths of reinforcement strands;

(b) inserting the thus exposed length of optical fiber into the first terminal end and through the passage to at least said second terminal end of the tubular extension;

(c) applying an adhesive layer about the outer surface of the tubular extension;

(d) positioning the exposed reinforcement strands about the outer diameter of the tubular extension over the adhesive layer;

(e) positioning a length of heat-shrink tubing about the reinforcement strands positioned on the tubular extension and extending over a portion of the jacket member remaining on the terminal end portion of the fiber optic cable; and (f) heating the resulting assembly to a temperature sufficient to cause the heat-shrink tubing to shrink to a smaller diameter sufficient to hold the exposed reinforcement strands in adhesive engagement with the adhesive layer on the outer diameter of the tubular member and to form a shrink-fit bond of the tubing to the jacket.

3. The method according to claim 2 wherein the adhesive layer is supplied in the form of a tubular body of heat-activated adhesive.

4. The method according to claim 2 wherein the inner diameter of the tubular extension is slightly larger than the outer diameter of the optical fiber and an adhesive bond is formed between the inner diameter of the tubular extension and the optical fiber.

5. The method according to claim 2 wherein a hermetic seal is formed between the inner diameter of the tubular extension and the optical fiber adjacent the second terminal end of the tubular extension.

* * * * *